(12) United States Patent
Walther et al.

(10) Patent No.: US 10,918,117 B2
(45) Date of Patent: Feb. 16, 2021

(54) EXTRUDED PROTEIN PRODUCT AND METHODS OF MAKING

(71) Applicant: General Mills, Inc., Minneapolis, MN (US)

(72) Inventors: Goeran Walther, Plymouth, MN (US); Steven C Robie, Plymouth, MN (US); Kevin H Wright, Crystal, MN (US); Joel R Lafavor, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 559 days.

(21) Appl. No.: 15/000,499

(22) Filed: Jan. 19, 2016

(65) Prior Publication Data

US 2016/0205986 A1    Jul. 21, 2016

Related U.S. Application Data

(63) Continuation-in-part of application No. 14/599,763, filed on Jan. 19, 2015, now abandoned.

(51) Int. Cl.
| | | |
|---|---|---|
| *A23J 3/26* | (2006.01) |
| *A23J 3/16* | (2006.01) |
| *A23P 20/10* | (2016.01) |
| *A23P 30/20* | (2016.01) |
| *A23L 33/185* | (2016.01) |

(52) U.S. Cl.
CPC . *A23J 3/26* (2013.01); *A23J 3/16* (2013.01); *A23L 33/185* (2016.08); *A23P 20/105* (2016.08); *A23P 20/11* (2016.08); *A23P 30/20* (2016.08)

(58) Field of Classification Search
None
See application file for complete search history.

(56) References Cited

U.S. PATENT DOCUMENTS

| | | | |
|---|---|---|---|
| 3,102,031 A | 8/1963 | Macallister et al. |
| 3,537,859 A | 11/1970 | Hamdy |
| 3,863,019 A | 1/1975 | Strommer |
| 3,925,566 A | 12/1975 | Reinhart et al. |
| 4,338,339 A | 7/1982 | Edwards |
| 4,568,550 A | 2/1986 | Fulger et al. |
| 4,579,749 A | 4/1986 | Ishizuka et al. |

(Continued)

FOREIGN PATENT DOCUMENTS

| | | |
|---|---|---|
| CN | 1393169 | 1/2003 |
| EP | 0262276 | 4/1988 |

(Continued)

OTHER PUBLICATIONS

Ilo et al., "Role of Lipids in the Extrusion Cooking Processes", Grasas y Aceites, vol. 51, Fasc. 1-2, 2000, pp. 97-110.

*Primary Examiner* — Elizabeth Gwartney
(74) *Attorney, Agent, or Firm* — Diederiks & Whitelaw, PLC; Gregory P. Kaihoi, Esq.; Rachel A. Kahler

(57) ABSTRACT

The present disclosure relates to extruded protein products and methods for producing an extruded protein product. In particular, an extruded piece is disclosed having a high protein content and having a desirable texture and flavor. Methods for making an extruded piece include processing, under extrusion conditions, a combination of a powdered protein ingredient, a protein matrix disruptive ingredient, water, and an oil.

16 Claims, 9 Drawing Sheets

1A

1C

1E

1B

1D

1F

(56) References Cited

U.S. PATENT DOCUMENTS

| | | |
|---|---|---|
| 4,627,985 A | 12/1986 | Yada et al. |
| 4,978,544 A | 12/1990 | Sexton |
| 5,071,668 A | 12/1991 | Van Lengerich et al. |
| 5,464,644 A | 11/1995 | Wullschleger et al. |
| 7,419,695 B1 | 9/2008 | Taillie et al. |
| 8,158,179 B2 | 4/2012 | Bouvier et al. |
| 8,293,317 B2 | 10/2012 | Fannon et al. |
| 8,685,485 B2 | 4/2014 | McMindes et al. |
| 8,778,442 B2 | 7/2014 | Khan et al. |
| 9,314,045 B2 | 4/2016 | Nishimura et al. |
| 2003/0064145 A1 | 4/2003 | Fannon |
| 2006/0073261 A1 | 4/2006 | McMindes et al. |
| 2006/0141125 A1 | 6/2006 | Gifford |
| 2008/0102165 A1 | 5/2008 | Ning et al. |
| 2008/0248167 A1 | 10/2008 | McMindes et al. |
| 2009/0155447 A1* | 6/2009 | Moore ............... A23J 3/16 426/656 |
| 2011/0290122 A1 | 12/2011 | Asencio et al. |
| 2012/0093994 A1* | 4/2012 | Hsieh ............... A23J 3/16 426/549 |
| 2012/0269939 A1 | 10/2012 | Hahn et al. |
| 2013/0251877 A1 | 9/2013 | Levin et al. |
| 2016/0205985 A1 | 7/2016 | Ealther et al. |

FOREIGN PATENT DOCUMENTS

| | | |
|---|---|---|
| WO | WO 1995/016368 | 6/1995 |
| WO | WO 2003/000063 | 1/2003 |
| WO | WO 2011/011456 | 1/2011 |
| WO | WO 2013/192284 | 12/2013 |
| WO | WO 2016/150834 | 9/2016 |

* cited by examiner

4A

4B

4C

4D

4E

4F

Extruded pieces (Sample B4)

TVP imitation bacon bits

Extruded pieces (Sample B4)

TVP imitation bacon bits

Extruded pieces (Sample V16)

TVP imitation bacon bits

Extruded pieces (Sample V16)

TVP imitation bacon bits

EXTRUDED PROTEIN PRODUCT AND METHODS OF MAKING

CROSS-REFERENCE TO RELATED APPLICATIONS

This application is a continuation-in-part of U.S. patent application Ser. No. 14/599,763 filed Jan. 19, 2015 entitled "Extruded Protein Product and Methods of Making", pending. The entire contents of this application are incorporated herein by reference.

TECHNOLOGY

The present disclosure generally relates to an extruded protein product and methods of making such a product.

BACKGROUND

High protein food products have found popularity among consumers as a way to eat nutritionally dense foods. Consumers want diverse ways to get increased protein into their diets. Thus, there is a need for new high protein food products to satisfy the increasing consumer desire for protein.

SUMMARY

Provided herein is a composition including extruded pieces. The extruded pieces include protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight. The oil can be substantially uniformly distributed throughout the extruded pieces.

In some embodiments, the extruded pieces can have protein granules within, or surrounded by, a matrix that includes the protein matrix disruptive ingredient. The protein granules can have a substantially non-linearly oriented protein matrix, or the protein granules can have regions of a linearly oriented protein matrix. The protein granules can have an average size greater than 75 µm.

In some embodiments, the extruded pieces can have a texture analysis measurement of from about 1000 g to about 7400 g force, or from about 2000 g to about 5000 g force, and/or a density of from about 0.5 g/cc to about 1.0 g/cc.

The extruded pieces can have a rough and/or uneven surface.

The protein can include one or a combination of soy protein, whey protein, bean protein, pea protein, wheat protein, canola protein, or algae protein.

In some embodiments, the protein matrix disruptive ingredient can be a non-protein component of a protein concentrate or a protein isolate.

In some embodiments, the protein matrix disruptive ingredient can be a flour or a syrup. In some embodiments, the protein matrix disruptive ingredient can include a starch, a sugar, or a fiber.

In some embodiments, extruded pieces can have a protein content of 45-70%, or 60-70%, by weight and have a cold water hydration rate of from about 1.6 to about 1.9, or from about 1.7 to about 1.9.

In some embodiments, extruded pieces can have a protein content of 45-70%, or 60-70%, by weight and have a hot water hydration rate of from about 2.0 to about 2.8, or from about 2.5 to about 2.8.

In some embodiments, extruded pieces can have a protein content of 40-65% by weight and have a cold water hydration rate of from about 2.1 to about 2.7.

In some embodiments, extruded pieces can have a protein content of 40-65% by weight and have a hot water hydration rate of from about 3.0 to about 3.75.

In some embodiments, the inclusions can be one or a combination of nuts, seeds, fruit, grains, or coconut. In some embodiments, the extruded pieces can have inclusions substantially uniformly distributed throughout the extruded pieces.

In some embodiments, extruded pieces can include one or more colorant or flavorant. In some embodiments, extruded pieces can have a marbled appearance.

The oil can be substantially uniformly distributed throughout the extruded pieces.

In some embodiments, the extruded pieces can have a sugar-based coating, a fat-based coating, or a protein-based coating.

In some embodiments, an extruded piece can be adhered with one or more edible component to form a cluster. In some embodiments, an extruded piece can be adhered to one or more additional extruded piece to form a cluster. In some embodiments, an extruded piece can be adhered with one or more edible component to form a bar.

A food product is also provided herein. A food product includes food product pieces and extruded pieces having protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight.

A composition is provided herein including particulates derived from extruded pieces, where the extruded pieces have protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight. The particulates can be coated on a food product or formed into a food product.

A food product or kit is provided herein. The food product or kit includes a first food component and at least a second food component, where the first food component includes extruded pieces having protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight.

A method of making a food product is also provided herein. The method includes processing, under extrusion conditions, a powdered protein ingredient comprising at least 45% protein by weight of the powdered protein ingredient and a protein matrix disruptive ingredient combined with water and an oil to form a protein matrix composition having a protein content of from about 10% to about 65% by weight, a moisture content of from about 25% to about 55% by weight and an oil content of from about 1% to about 15% by weight, and forming the protein matrix composition into pieces to form the food product.

In some embodiments, the protein product can include protein granules within, or surrounded by, a matrix that includes the protein matrix disruptive ingredient. The protein granules can have a substantially non-linearly oriented protein matrix, or the protein granules can have regions of a linearly oriented protein matrix. The protein granules can have an average size greater than 75 µm.

The extrusion conditions can include a specific mechanical energy (SME) of from about 8 Wh/kg to about 100 Wh/kg, a die pressure of from about 150 PSI to about 1000 PSI, and/or a die temperature of from about 200° F. to about 350° F.

In some embodiments, the powdered protein ingredient includes at least a portion of the protein matrix disruptive ingredient.

In some embodiments, the protein matrix disruptive ingredient can be a flour or a syrup. In some embodiments, the protein matrix disruptive ingredient can include a starch, a sugar, or a fiber.

The method can further include drying the protein matrix composition pieces to a moisture content of from about 1.5% to about 8% by weight to form extruded pieces. In some embodiments, extruded pieces have a texture analysis measurement of from about 1000 g to about 7400 g force, or from about 2000 g to about 5000 g force, and/or a density of from about 0.5 g/cc to about 1.0 g/cc. In some embodiments, the oil is substantially uniformly distributed throughout the pieces.

In some embodiments, the method can further include applying a sugar-based or protein-based coating to the extruded pieces to form coated pieces and drying the coated pieces.

In some embodiments, the method can further include applying a fat-based coating to the extruded pieces to form coated pieces and cooling the coated pieces.

In some embodiments, the method can further include comminuting the extruded pieces to form particulates. The method can further include producing a food product including the particulates and/or coating a food product with the particulates.

In some embodiments, the method can further include processing inclusions with the powdered protein ingredient, protein matrix disruptive ingredient, water, and oil. The inclusions can include one or a combination of nuts, seeds, fruit, grains, or coconut.

A method of making a food composition is also provided. The method includes hydrating extruded pieces that have protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusion in an amount of 0% to about 50% by weight to form a first food component, and combining the first food component with at least a second food component to make the food composition.

In some embodiments, the extruded pieces can be formulated to perform as a substitute for bacon bits or as a substitute for ground meat.

In some embodiments, the second food component can be a noodle component, a potato component, an oil-in-water emulsion, and/or a seasoning component.

In some embodiments, the food composition is a pasta dish, a salad, a potato dish, or a soup.

A method of making a frozen or refrigerated food product is provided. The method includes combining a first food component of extruded pieces with at least a second food component to make the frozen or refrigerated food product. The extruded pieces include protein granules with an average size greater than 75 µm within a matrix comprising a protein matrix disruptive ingredient, a protein content of from about 10% to about 65% by weight, a moisture content of from about 25% to about 55% by weight and an oil content of from about 1% to about 15% by weight, the oil being substantially uniformly distributed throughout the extruded pieces.

In some embodiments, the frozen or refrigerated food product is a frozen or refrigerated pizza or a frozen or refrigerated pasta product.

In some embodiments, the extruded pieces can be formulated to perform as a substitute for bacon bits or as a substitute for ground meat.

A frozen or refrigerated food product is provided herein. The frozen or refrigerated food product includes extruded pieces that have protein granules with an average size greater than 75 µm within a matrix comprising a protein matrix disruptive ingredient, a protein content of from about 10% to about 65% by weight, a moisture content of from about 25% to about 55% by weight and an oil content of from about 1% to about 15% by weight, the oil being substantially uniformly distributed throughout the extruded pieces.

In some embodiments, the frozen or refrigerated food product can also include a second food component, such as a crust component, a sauce component, and/or a noodle component.

In some embodiments, the frozen or refrigerated food product is a frozen or refrigerated pizza or a frozen or refrigerated pasta product.

In some embodiments, the extruded pieces can be formulated to perform as a substitute for bacon bits or as a substitute for ground meat.

These and various other features and advantages will be apparent from a reading of the following detailed description.

DETAILED DESCRIPTION

Extrusion technology has begun to produce protein products that have an enjoyable texture, while reducing or eliminating the use of animal protein. Many of these products are designed to mimic whole or ground meat and are meant to be eaten in place of meat. However, consumers expect an even greater variety of high protein foods that are suitable for different eating occasions. As described herein, a new protein product has been produced having a high protein content and having an enjoyable texture and flavor that is suitable for a wide variety of eating occasions.

A protein product provided herein can be a composition comprising extruded pieces. Extruded pieces described herein comprise protein, a protein matrix disruptive ingredient, oil, and water. In some embodiments, extruded pieces provided herein include inclusions.

Extruded pieces provided herein comprise protein in an amount of about 30% to about 90% (e.g., about 50% to about 75%) by weight. The amount and type of protein included in extruded pieces described herein can be selected to produce a protein matrix when extruded in the presence of water and an oil. In some embodiments, the amount and type of protein can be selected to produce extruded pieces that have functions for different eating occasions. For example, in some embodiments, extruded pieces that are formulated for eating as a breakfast cereal without requiring substantial hydration can have a protein content of from about 30% to about 60% (e.g., from about 40% to about 55%). In another example, extruded pieces that are formulated to perform as a substitute for ground meat, such as ground beef or ground turkey, and intended to be hydrated and heated for consumption can have a protein content of from about 50% to about 90% (e.g., from about 45% to about 70%, or about 60% to about 70%). In another example, extruded pieces that are formulated to perform as a substitute for bacon bits, which may or may not be hydrated and/or heated prior to consumption can have a protein content of from about 30% to about 70% (e.g., from about 40% to about 65%).

Figure 7:
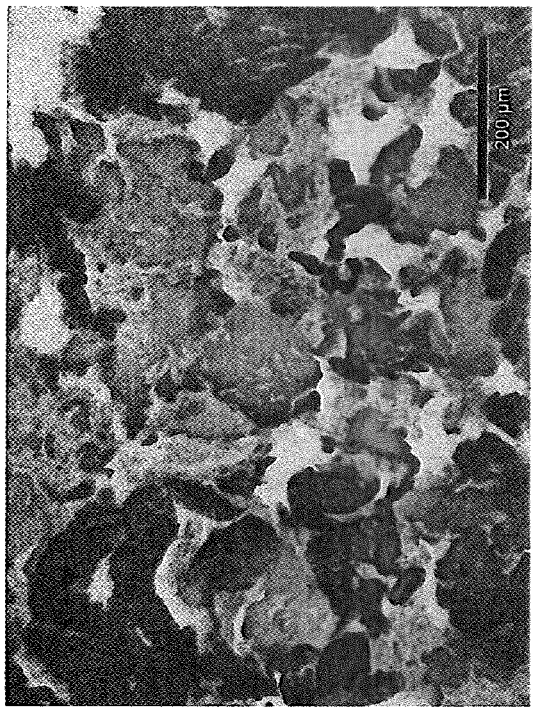
FIG. 7 includes light micrographs of a TVP imitation bacon bit (left image) and an extruded piece according to an embodiment disclosed herein (right image) that have been stained to visualize protein.
Figure 7:
Figure 9:
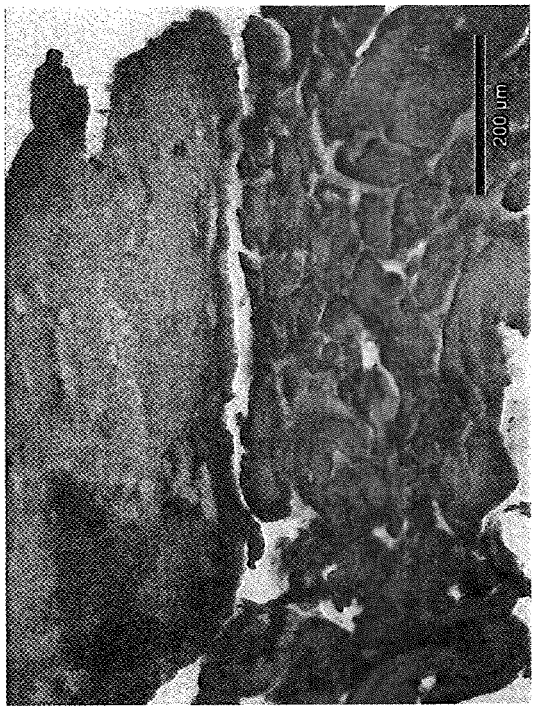
FIG. 9 includes light micrographs of a TVP imitation bacon bit (left image) and an extruded piece according to an embodiment disclosed herein (right image) that have been stained to visualize protein.
Figure 9:

As illustrated in FIGS. 3A and 4A, the right image in FIG. 7, and the right image in FIG. 9, an extruded piece provided herein can have granules of compacted protein within, or surrounded by, a matrix that includes protein matrix disruptive ingredient. As used herein, the term "protein granule" refers to a particle of compacted protein. The protein granules can range from having a protein matrix that is substantially non-linearly oriented to a protein matrix that has localized regions of linear orientation that is relatively non-fibrous. This is in contrast to an extruded product, such as textured vegetable protein (shown in FIGS. 3C, 3D, 4C, 4D, the left image in FIG. 7 and the left image of FIG. 9), having a substantially entirely linearly oriented protein matrix with elongated, fibrous strands rather than granules of protein. Another example of an extruded product that has a substantially entirely linearly oriented protein matrix includes an extruded piece that does not contain oil, as illustrated in FIGS. 3B and 4B.

When compared to extruded soy crisps, as shown in FIGS. 3E, 3F, 4E, and 4F, which have small agglomerations of protein that are about 50 µm across or less, protein granules of an extruded piece provided herein can be relatively large, averaging at least about 75 µm across (e.g., on average, at least 100 µm across). Without being bound to theory, it is believed that relatively large protein granules within, or surrounded by, a matrix that includes a protein matrix disruptive ingredient can contribute to a desired texture of an extruded piece provided herein, whether dry or hydrated with hot or cold water, an aqueous solution, or an oil-in-water emulsion (e.g., mayonnaise).

Protein suitable for use in an extruded piece includes plant-based protein (e.g., soy protein, pea protein, wheat protein, oat protein, bean protein, canola protein, lentil protein, chickpea protein, broccoli protein, and the like), microbe-based protein (e.g., algae protein, bacterial protein, and the like), fungal protein (e.g., yeast protein, mushroom protein, and the like), and animal-based protein (e.g., dairy protein, egg protein, insect protein, and the like). In some embodiments, a protein can be selected to produce a desired characteristic. For example, soy, pea, or bean protein, or the like, can be selected to exclude grain-based ingredients, or whey protein can be selected to produce extruded pieces having a crunchier texture. Other characteristics can include, for example, GMO-free, gluten-free, soy-free, and/or allergen free. In some embodiments, blends of proteins can be used in extruded pieces provided herein.

In some embodiments, a protein with a specific functional property can be used. In some embodiments, a protein can be derived from its source (e.g., a plant, animal, or microorganism) without altering the structure and related functional properties. In other embodiments, the chemical structure and functional properties of a protein can be altered during and/or after derivation from its source. For example, a soy protein concentrate or isolate with high water binding properties can be used to achieve a desired texture.

Extruded pieces also comprise a protein matrix disruptive ingredient in an amount of from about 5% to about 50% (e.g., about 15% to about 40%) by weight. As used herein, the term "protein matrix disruptive ingredient" refers to one or a combination of a flour (e.g., a grain flour, a legume flour, a vegetable or fruit powder, cocoa, or the like), a starch (e.g., tapioca starch, corn starch, a modified starch, a pregelatinized starch, or the like), a sugar (e.g., sucrose, fructose, lactose, or the like), a fiber (e.g., sugar cane fiber, inulin, oat fiber, pea fiber, bran, hull fiber, or the like), a polyol (e.g., glycerol or the like), syrups (e.g., corn syrup, tapioca syrup, honey, or the like), or the like. In some embodiments, a protein matrix disruptive ingredient can include a non-protein component of a protein rich flour (e.g., a soy flour, a pea flour, a lentil flour, or a bean flour), a protein concentrate, or a protein isolate. Without being bound by theory, it is believed that a protein matrix disruptive ingredient disrupts the protein matrix in an extruded piece provided herein to contribute to a desired texture, desired hydration properties, and/or protein matrix structure of the extruded piece.

A protein matrix disruptive ingredient can be selected, for example, in order to provide a desired nutritional profile, flavor, sweetness, and/or texture to an extruded piece that contains the protein matrix disruptive ingredient. For example, oat hull fiber can be selected to produce extruded pieces having a desired fiber content, or a syrup can be selected to adjust texture and/or taste. In some embodiments, a protein matrix disruptive ingredient can be selected to provide a desired characteristic for an extruded piece, such as being grain-free, gluten-free, GMO-free, soy-free, and the like. For example, tapioca flour or starch can be selected to produce a grain-free extruded piece.

Extruded pieces provided herein include oil in an amount of from about 2% to about 20% (e.g., about 2% to about 15%) by weight. Oil in an extruded piece provided herein can be distributed substantially uniformly throughout the piece. This is in contrast to known textured vegetable protein products, which generally are made from defatted or low fat ingredients and do not contain oil or only residual amounts of oil (e.g., less than 2% by weight), or if oil is present, it is found mainly near the surface as a surface treatment of the textured vegetable protein. For example, oil spraying is commonly used to topically apply seasoning or flavor to textured vegetable protein products. The disclosed extruded pieces also contrast to puffed protein products currently available (e.g., soy crisps), which generally contain substantially no oil in the matrix.

Any edible oil is suitable for use in an extruded piece provided herein. Preferably, an oil included in an extruded piece is liquid at room temperature. Suitable oils include, without limitation, canola oil, olive oil, soy oil, sunflower oil, corn oil, and the like. An oil to be included in an extruded piece can be selected based on, for example, nutritional profile, compatibility with extrusion process and/or equipment, texture and/or mouthfeel imparted to the extruded piece, and/or price.

Extruded pieces described herein include water in an amount of from about 1.5% to about 8% (e.g., about 1.5% to about 6%) by weight. The amount of water in an extruded piece is generally selected in order to provide shelf stability and/or a desired texture to the extruded piece. A lower water content can be selected to increase shelf life of an extruded piece. In some embodiments, a higher water content can be selected in order to reduce the hardness of an extruded piece. Water content can also be selected to maintain solubility of one or more ingredients, such as an antioxidant, in an extruded piece.

In some embodiments, extruded pieces provided herein include inclusions up to about 50% by weight. As used herein, the term "inclusion" refers to a substantially solid edible particle. An inclusion is visually (i.e., macroscopically) distinguishable from the protein matrix of an extruded piece. Inclusions, when included in an extruded piece, are substantially uniformly distributed throughout the piece. Examples of inclusions include, without limitation, nut pieces, whole grain pieces, seeds and/or seed pieces, fruit pieces, coconut, confection pieces, and the like.

One or more additional ingredients can be included in or on the surface of extruded pieces provided herein. An additional ingredient can be selected to impart a desired nutritional profile, flavor, sweetness, texture, shelf life, and/or visual appearance to an extruded piece, or to provide an advantage to the production process of an extruded piece. For example, one or more flavorant, such as vanilla extract or a spice, can be included in or on the surface of an extruded piece to provide a desired sweet or savory flavor. In another example, one or more colorants can be included in or on the surface of an extruded piece to provide an appearance similar to ground meat or bacon bits, such as a marbled appearance.

Examples of additional ingredients that can be included in an extruded piece include, without limitation, flavorants, nutritive and/or non-nutritive sweeteners, salts, colorants, antioxidants, vitamins, and/or minerals, and the like.

Extruded pieces provided herein can have a texture analysis measurement of from about 1000 g to about 7400 g (e.g., from about 1000 g to about 5600 g, or from about 2000 g to about 5000 g) force. As used herein, the term "texture analysis measurement" refers to an average 50% strain force of 10 replicate measurements in g obtained from the following protocol: a single piece is placed on the stage of a TA.HDPlus Texture Analyzer (Texture Technologies, Massachusetts, USA) and subjected to a 50% strain test at a speed of 2 mm/second using a 50 kg load cell and a 1 inch cylindrical stainless steel probe.

In some embodiments, extruded pieces can have a density of from about 0.5 g/cc to about 1.0 g/cc (e.g., from about 0.7 g/cc to about 1.0 g/cc, or about 0.8 g/cc to about 0.9 g/cc). As used herein, density is measured by the displacement of granular sodium chloride. About 150 cc of sodium chloride is placed in a 250 ml graduated cylinder and tapped in a tap density analyzer 300×. The volume of salt is recorded to the nearest cc. The salt is then removed from the cylinder. The salt is poured back into the cylinder in about 10-20 cc aliquots alternating with pieces of a known weight of extruded pieces until the volume is approximately 150 cc. The remaining salt is then placed in the cylinder. The cylinder is again tapped 300× in the tap density analyzer. The volume is recorded and the particle density of each sample is calculated as the weight of the sample divided by the difference in tapped volume with and without sample present.

Extruded pieces provided herein can absorb water at a rate that contributes to a desired eating experience. Water absorption rate is measured herein by cold water hydration rate and hot water hydration rate. As used herein, cold water hydration rate is measured by combining 20 g of a sample of extruded pieces with 200 g water at 67° F., and allowed to sit at room temperature for 10 minutes. The extruded pieces are then drained for 30 seconds using a strainer and the mass of the drained pieces are measured. The cold water hydration rate is calculated by dividing the mass of the drained extruded pieces divided by the mass of the extruded pieces prior to combination with water (20 g). As used herein, hot water hydration rate is measured by combining 20 g of a sample of extruded pieces with 200 g boiling water, which are then covered and allowed to sit at room temperature for 5 minutes. The extruded pieces are then drained for 30 seconds using a strainer, and the mass of the drained pieces is measured. The hot water hydration rate is calculated in the same way the cold water hydration rate is calculated (i.e., mass of drained extruded pieces/20 g). Cold water hydration rates for extruded pieces described herein can be about 1.5 or greater (e.g., from about 1.5 to about 5), while hot water hydration rates can be about 2 or greater (e.g., from about 2 to 4). Cold and hot water hydration rates can be adjusted as desired for different eating experiences. For example, an extruded piece suitable for use as a bacon bit substitute can have a cold water hydration rate from about 2.1 to about 2.7, or a hot water hydration rate of from about 3.0 to about 3.75. In another example, an extruded piece suitable for use as a ground meat substitute can have a cold water hydration rate from about 1.6 to 1.9 (e.g., from about 1.7 to 1.9), or a hot water hydration rate of from about 2.0 to about 2.8 (e.g., from about 2.5 to 2.8).

In some embodiments, extruded pieces provided herein can have a rough or uneven surface. A rough surface can provide a visually interesting appearance to extruded pieces. In some embodiments, inclusions can contribute to a rough or uneven surface of an extruded piece.

In some embodiments, extruded pieces can have average diameter of from about 2 mm to about 15 mm (e.g., from about 5 mm to about 10 mm). The size of an extruded piece can be adjusted for the desired use of the extruded piece or to provide a manufacturing advantage. For example, the size of an extruded piece can be adjusted to provide a desired size for eating as a stand-alone snack. In another example, the size of an extruded piece can be adjusted to result in a desired drying time during manufacturing. Piece size can be adjusted using known methods, such as die size and/or die shape selection, rate of extrusion, and/or cutter speed.

Extruded pieces can be produced by processing, under extrusion conditions, a powdered protein ingredient and a protein matrix disruptive ingredient with sufficient water and an oil to form a protein matrix composition. As used herein, the term "extrusion conditions" refers to subjecting components to heat, pressure, and shear in an extruder. Extrusion conditions can include applying sufficient specific mechanical energy (SME) (e.g., at least about 8 Wh/kg, or from about 10 Wh/kg to about 100 Wh/kg, about 10 Wh/kg to about 50 Wh/kg, or from about 15 Wh/kg to about 35 Wh/kg) to produce extruded pieces having a desired protein matrix. In some embodiments, extrusion conditions can comprise a die temperature of at least 200° F. (e.g., from about 200° F. to about 350° F., or from about 250° F. to about 300° F.). As used herein, the term "die temperature" refers to the temperature of a protein matrix composition inside the die of an extruder just before exiting the die. In some embodiments, extrusion conditions can comprise a die pressure of at least about 150 PSI (e.g., from about 150 PSI to about 1000 PSI, about 200 PSI to about 600 PSI, or from about 250 PSI to about 350 PSI). As used herein, the term "die pressure" refers to the pressure a protein matrix composition is exposed to inside the die of an extruder just before exiting the die.

A powdered protein ingredient, as used herein, is an edible dry ingredient comprising at least 45% protein (e.g., at least 50%, at least 70%, or at least 90%) by weight. Examples of powdered protein ingredients include, without limitation, flours having a protein content of at least 45% (e.g., defatted soy flour), protein concentrates (e.g., soy protein concentrate, pea protein concentrate, whey protein concentrate, and the like), protein isolates (e.g., soy protein isolate, pea protein isolate, whey protein isolate, and the like), pure proteins, and combinations thereof. A powdered protein ingredient can be included in an amount sufficient to produce a protein matrix composition having a protein content of about 10% to about 65% (e.g., about 15% to about 50%) protein by weight of the protein matrix composition.

In some embodiments, a powdered protein ingredient can comprise a protein matrix disruptive ingredient. For example, a protein concentrate or a protein isolate can include, for example, starch, sugar, fiber, and/or inorganic components, and the like. In some embodiments, all or part of the protein matrix disruptive ingredient can be combined with powdered protein ingredient, water, and oil as a separate ingredient.

Water and oil are combined with the powdered protein ingredient, protein matrix disruptive ingredient, and optional inclusions and/or other ingredients in amounts sufficient to form a protein matrix composition having a moisture content of from about 25% to about 55% by weight and an oil content of from about 1% to about 15% by weight. Water can be provided in any appropriate form. For example, tap or filtered water, fruit or vegetable juice, or the like, can be used to provide the desired moisture content. In some embodiments, water and oil can be provided as an emulsion for combination with the powdered protein ingredient, protein matrix disruptive ingredient, and optional inclusions and/or other ingredients.

It has been discovered that incorporating oil into a protein matrix composition results in extruded pieces that have a structure that includes granules of protein loosely packed in a matrix that includes a protein matrix disruptive ingredient that imparts a desirable texture. The addition of too much oil (e.g., more than 15% by weight) results in incomplete incorporation of the oil. It has also been discovered that too little water addition (i.e., less than about 25% by weight) can result in oil being squeezed from the protein matrix composition, which alters the texture of extruded pieces and/or interferes with the proper function of extruder equipment. However, it has also been discovered that the addition of too much water (i.e., more than 55% by weight) can result in extruded pieces that are harder than desired or have an undesired even surface appearance. It has further been discovered that incorporation of water and oil into a protein matrix composition allows for the incorporation of inclusions that are visually distinguishable from protein matrix rather than being crushed or degenerated during extrusion at low water and/or low or no oil conditions such that inclusions remain visually indistinguishable.

The amounts of oil and/or water combined with a powdered protein ingredient and protein matrix disruptive ingredient can be adjusted in order to result in a desired appearance and/or texture of extruded pieces. As the amount of oil is increased, extruded pieces generally appear rougher and have a crunchier texture. As the amount of water is increased, extruded pieces generally appear smoother and have a harder texture.

The amounts of oil and/or water combined with a powdered protein ingredient and protein matrix disruptive ingredient can also be adjusted in order to adjust the amount of shear a protein matrix composition is subjected to. Generally, higher amounts of water and/or oil reduce the amount of shear that a protein matrix composition is subjected to. In some embodiments, higher water and/or oil can be used to make extruded pieces with relatively large inclusions.

In some embodiments, dry ingredients, such as a powdered protein ingredient, a protein matrix disruptive ingredient, inclusions and/or other optional components, can be combined prior to combining with water and/or oil under extrusion conditions. In some embodiments, components can be added stepwise or at essentially the same time before combining under extrusion conditions.

Extruders suitable for use in the methods provided herein can include, for example, a single screw, twin, or triple screw extruder, or a ring extruder. For example a co-rotating, intermeshing, twin screw extruder can be used in a method provided herein. Manufacturers for co-rotating twin screw extruders include, for example, Coperion, Wenger, Clextral, Bersttorf, APV, Buhler, and Leistritz. Manufacturers for single screw extruders include, for example, Wenger, APV, and Buhler.

A protein matrix composition can be formed into pieces using any suitable method to form protein matrix composition pieces. For example, a protein matrix composition can passed through an extrusion die and then cut in order to form pieces. During formation, the amount of turbulence or laminar flow that a protein matrix composition is exposed to in the extruder die prior to exiting the extruder die can be adjusted to result in protein granules that include regions of linear oriented protein matrix (less turbulence), or protein granules that include substantially non-linearly oriented protein matrix (more turbulence) as desired. Turbulence can be increased in an extrusion die by, for example, including a static mixer, or by introducing small, large or multiple variations in die cross section diameter or shape.

Following formation, protein matrix composition pieces can be dried to form extruded pieces using any appropriate method to reach a moisture content of from about 1.5% to about 8% to form extrude pieces. For example, protein matrix composition pieces can be subjected to heated air in order to dry them to the desired moisture content.

In some embodiments, extruded pieces provided herein can be packaged and sold as a food product without any other components. Such packaged extruded pieces can be intended to be eaten as a food product alone or in combination with other food products. For example, extruded pieces can be packaged and sold as a stand alone snack, as part of a ready-to-eat breakfast cereal, or can be used as a topping for yogurt or oatmeal, as a bacon bit substitute, or as a hydratable ground meat crumble substitute as part of a dry meal kit. Extruded pieces provided herein can have a texture suitable such that they need not be further prepared for eating by, for example, heating or soaking. However, in some embodiments, it is to be understood that an individual may enjoy heating and/or soaking extruded pieces provided herein during various eating occasions, such as when combined with oatmeal, when used as a ground meat substitute (e.g., in a pasta or a taco or burrito), when used in a soup, when used as a bacon bit substitute in hot foods (e.g., in a potato dish, such as mashed potatoes), or when used hydrated or partially-hydrated in a chilled or ambient temperature food, such as a pasta salad.

In some embodiments, extruded pieces provided herein can be combined with other food components to produce a food product. For example, extruded pieces can be combined with food product pieces, such as ready to eat (RTE) cereal pieces or popcorn, to produce a food product having desired protein content. In another example, extruded pieces can be combined with dried fruit and/or nuts to produce a snack mix type product or a granola type product.

In some embodiments, extruded pieces provided herein can be packaged into a kit with other food products. For example, extruded pieces can be combined as a kit with yogurt, which can be combined prior to eating. Other examples of kits that can include the extruded pieces described herein include, without limitation, taco kits (e.g., including seasoning and/or taco shells or tortillas), pasta kits (e.g., including noodles), instant potato kits (e.g., mashed or potatoes au gratin), instant soup kits, and the like.

In some embodiments, an extruded piece can be adhered with one or more edible component, such as another extruded piece, nut pieces, fresh or dried fruit pieces, seeds, coconut, grain, and the like, to form a cluster. An extruded piece and one or more edible component can be adhered to each other using any appropriate method and ingredients (e.g., edible binders and the like). For example, a cluster can be produced using a combination of an extruded piece and rolled oats adhered using a honey-based binder or slurry. Clusters can be provided as a food product alone or as part of a food product, such as a snack mix, ready to eat cereal, or oatmeal mix.

In some embodiments, an extruded piece can be adhered with one or more edible component in a similar manner to a cluster described above, and formed into a snack or breakfast bar. Such a snack bar can be crunchy or chewy, sweet or savory.

In some embodiments, extruded pieces provided herein can be comminuted into particulates (i.e., having an average diameter of less than 2 mm) to produce a composition derived from extruded pieces that resembles crumbs or a powder. Such particulates can be used, for example, to coat food products, such as ready to eat cereal pieces, snack food pieces, and the like. In some embodiments, particulates derived from extruded pieces provided herein can be combined with other components and formed into a food product, such as ready to eat cereal pieces, snack food pieces, baked goods, and the like. In some embodiments, particulates derived from extruded pieces disclosed herein can be used in addition to, or to partially or completely replace, protein ingredients, such as soy protein concentrate, in other food products where a high protein content is desired.

In some embodiments, following formation, protein matrix composition pieces can be either partially dried (e.g., to a moisture greater than about 8%) or left undried (e.g., at a moisture level of from 25% to about 55%) and frozen or refrigerated. Such frozen or refrigerated protein matrix composition pieces can be packaged as-is as a ground meat substitute or bacon bit substitute, or combined with one or more additional food components to produce a frozen or refrigerated food product, such as a frozen or refrigerated pizza or frozen or refrigerated pasta product.

It is to be understood that extruded pieces provided herein can be used for either sweet or savory applications. Extruded pieces disclosed herein can provide a benefit of being a high protein stand-alone food product or provide added protein in combination with other components in food products while also providing an improved flavor and/or texture over other known high protein pieces, such as textured vegetable protein or puffed protein crisps.

EXAMPLES

Example 1

Formulations including soy protein isolate (SPI), flour (F), sugar (S), oil (O), water (W), and flavor (R) according to Table 1 (SPI, F, S, and R are shown as % weight of dry ingredients and O and W are shown as % weight of protein matrix composition) were combined in a Buhler BCTL-42 extruder (Buhler Inc., Minnesota, USA) to form a protein matrix composition. The protein matrix composition was extruded through a single hole die having a diameter of 0.159 inches (4 mm) and cut to form protein matrix composition pieces approximately 5 mm to 10 mm. The pieces were dried using tray dryer to a moisture content of about 1.5% to about 8% to form extruded pieces.

TABLE 1

| Sample | SPI | F | S | O | W | R | SME (Wh/kg) | Die temp. (° F.) | Die press. (PSI) |
|---|---|---|---|---|---|---|---|---|---|
| 1 | 75 | 20 | 4 | 5.4 | 59.8 | 0.6 | 9.6 | 248 | 152 |
| 2 | 75 | 20 | 4 | 6.5 | 50.4 | 0.6 | 15.4 | 253 | 199 |
| 3 | 75 | 20 | 4 | 7.8 | 40.4 | 0.6 | 24.6 | 265 | 297 |
| 4 | 75 | 20 | 4 | 9.0 | 30.7 | 0.6 | 27.9 | 274 | 330 |
| 5 | 75 | 20 | 4 | 0 | 33.7 | 0.6 | 82.6 | 313 | 810 |
| 6 | 75 | 20 | 4 | 3.5 | 56.6 | 0.6 | 14.9 | 257 | 193 |

TABLE 1-continued

| Sample | SPI | F | S | O | W | R | SME (Wh/kg) | Die temp. (° F.) | Die press. (PSI) |
|---|---|---|---|---|---|---|---|---|---|
| 7 | 75 | 20 | 4 | 4.4 | 46.7 | 0.6 | 17.1 | 262 | 273 |
| 8 | 75 | 20 | 4 | 5.2 | 36.6 | 0.6 | 24.5 | 275 | 411 |
| 9 | 75 | 20 | 4 | 1.8 | 37.9 | 0.6 | 32.1 | 284 | 506 |
| 10 | 75 | 20 | 4 | 1.5 | 48.2 | 0.6 | 20.0 | 275 | 320 |
| 11 | 75 | 20 | 4 | 1.2 | 58.0 | 0.6 | 14.5 | 259 | 213 |
| 12 | 65 | 30 | 4 | 6.5 | 50.1 | 0.6 | 12.6 | 256 | 194 |
| 13 | 65 | 30 | 4 | 7.8 | 40.3 | 0.6 | 18.3 | 263 | 294 |
| 14 | 65 | 30 | 4 | 9.0 | 30.7 | 0.6 | 19.9 | 274 | 305 |
| 15 | 65 | 30 | 4 | 5.9 | 27.6 | 0.6 | 23.9 | 282 | 377 |
| 16 | 65 | 30 | 4 | 5.6 | 31.8 | 0.6 | 23.1 | 282 | 412 |
| 17 | 65 | 30 | 4 | 4.8 | 41.7 | 0.6 | 19.9 | 272 | 337 |
| 18 | 65 | 30 | 4 | 1.6 | 43.0 | 0.6 | 25.1 | 275 | 370 |
| 19 | 65 | 30 | 4 | 1.9 | 33.1 | 0.6 | 46.2 | 288 | 547 |
| 20 | 65 | 30 | 4 | 2.1 | 2 | 0.6 | 47.8 | 291 | 571 |

Formulations were attempted using 25% moisture or less, but oil separated during extrusion.

Extruded pieces were eaten to determine acceptability of texture for consumption without further preparation (Table 2). Extruded pieces produced using a protein matrix composition having 55% moisture or greater were identified as having an unacceptable hardness when consumed. In addition, extruded pieces produced using a protein matrix composition having 55% moisture or greater exhibited a smooth, even surface. Extruded pieces produced using a protein matrix composition having no added oil resembled TVP and were relatively hard.

The protein content in extruded pieces from each of the samples was measured (as % weight) using the Dumas method. Overall fat content (as % weight) was measured by gas chromatography. Moisture content of extruded pieces was also measured by subjecting the extruded pieces to a vacuum oven at 70° C. for 16 hours. Protein, fat, and moisture content are shown in Table 2.

TABLE 2

| Sample | Measured protein (% wt) | Measured fat (% wt) | Moisture (% wt) | Acceptable texture for consumption |
|---|---|---|---|---|
| 1 | 58.5 | 13.2 | 6.7 | No |
| 2 | 61.4 | 13.9 | 2.3 | Yes |
| 3 | 61.9 | 13.4 | 1.9 | Yes |
| 4 | 61.6 | 12.3 | 2.9 | Yes |
| 5 | 65.7 | 1.9 | 7.8 | No (TVP-like) |
| 6 | 63.6 | 10.7 | 3.7 | No |
| 7 | 63.6 | 9.5 | 4.0 | Yes |
| 8 | 63.4 | 10.6 | 4.2 | Yes |
| 9 | 67.9 | 6.3 | 2.3 | Yes |
| 10 | 67.4 | 4.9 | 2.9 | Yes |
| 11 | 67.4 | 5.0 | 3.8 | No |
| 12 | 55.7 | 14.6 | 2.1 | Yes |
| 13 | 54.7 | 13.1 | 4.0 | Yes |
| 14 | 53.8 | 12.1 | 4.0 | Yes |
| 15 | 56.3 | 9.0 | 4.6 | Yes |
| 16 | 56.7 | 9.4 | 3.8 | Yes |
| 17 | 57.0 | 10.1 | 3.2 | Yes |
| 18 | 59.9 | 5.7 | 3.5 | Yes |
| 19 | 60.5 | 4.3 | 3.0 | Yes |
| 20 | 60.6 | 4.4 | 3.4 | Yes |

Texture analysis measurements were obtained for extruded pieces from each sample. Extruded pieces from each sample were individually placed on the stage of a TA.HDPlus Texture Analyzer (Texture Technologies, Massachusetts, USA) and subjected to a 50% strain test at a speed of 2 mm/second using a 50 kg load cell and a 1 inch cylindrical stainless steel probe. The average 50% strain force of 10 replicates determined that acceptable extruded pieces identified in Table 2 had texture analysis measurements from about 400 g to about 6600 g force, with texture analysis measurements greater than about 1000 g force being more preferred. Texture analysis measurements taken for a variety of commercially available textured vegetable protein (TVP) products, sold as meat analog, substitute, or imitation, ranged from about 7400 g to about 9000 g force, while a variety of commercially available soy crisps ranged from about 1300 g to about 1400 g force. Many available TVP products are considered to be too hard to be enjoyable to eat without soaking in a liquid first.

Particle density measurements were obtained for extruded pieces from each sample. Extruded pieces from each sample were analyzed for density by the displacement of granular sodium chloride. Briefly, about 150 cc of sodium chloride was placed in a 250 ml graduated cylinder and tapped in a tap density analyzer 300×. The volume of salt was recorded to the nearest cc. The salt was then removed from the cylinder. The salt was poured back into the cylinder in about 10-20 cc aliquots alternating with pieces of a known weight of sample until the volume was approximately 150 cc. The remaining salt was then placed in the cylinder. The cylinder was again tapped 300× in the tap density analyzer. The volume was recorded and the particle density of each sample was calculated as the weight of the sample divided by the difference in tapped volume with and without sample present. The average particle density for acceptable extruded pieces (see, Table 2) ranged from about 0.7 g/cc to about 1.0 g/cc, with densities from about 0.8 g/cc to about 0.9 g/cc being more preferred. Densities of a variety of TVP products ranged from about 0.7 g/cc to about 0.8 g/cc, while commercially available soy crisps ranged from about 0.4 g/cc to about 0.5 g/cc. Thus, while acceptable extruded pieces had a similar density to commercially available TVP products, texture was somewhat reduced to result in a product that provides a better eating experience than a TVP product without prior hydration.

Figure 1:
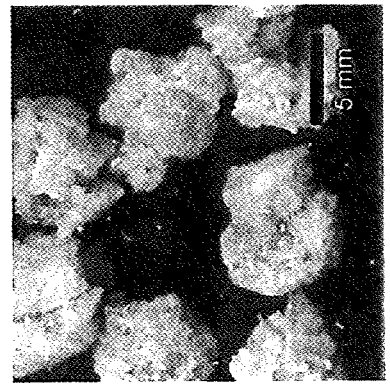
FIG. 1 includes macroscopic images of the surfaces of an extruded piece according to one embodiment (FIG. 1A), a piece that does not include oil (FIG. 1B), two commercially available textured vegetable protein products (FIGS. 1C and 1D), and two commercially available puffed soy protein crisps (FIGS. 1E and 1F).
Figure 1:
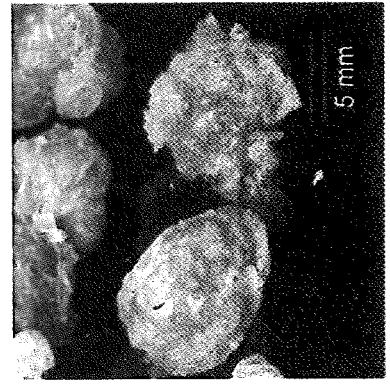
Figure 1:
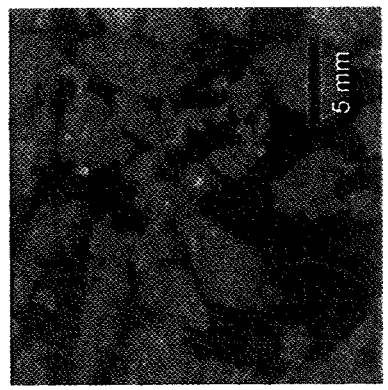
Figure 1:
Figure 1:
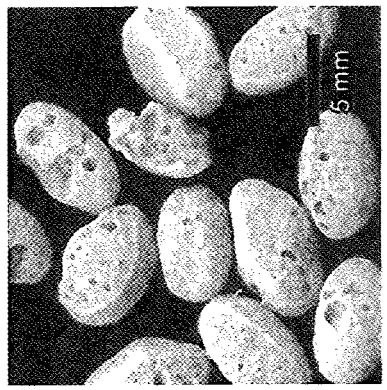
Figure 1:
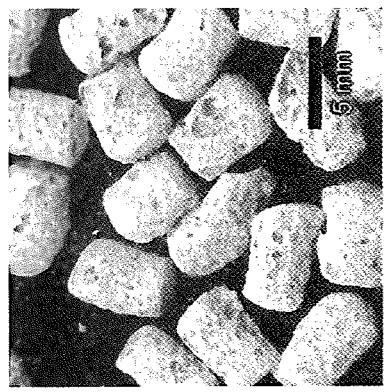
Figure 2:
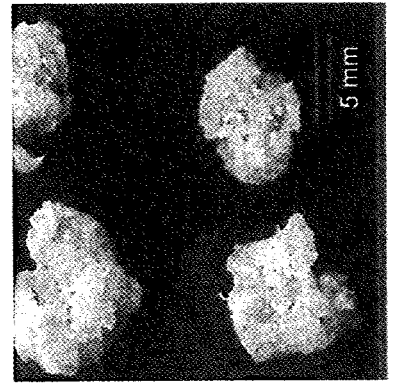
FIG. 2 includes macroscopic images of cross sections of an extruded piece according to one embodiment (FIG. 2A), a piece that does not include oil (FIG. 2B), two commercially available textured vegetable protein products (FIGS. 2C and 2D), and two commercially available puffed soy protein crisps (FIGS. 2E and 2F).
Figure 2:
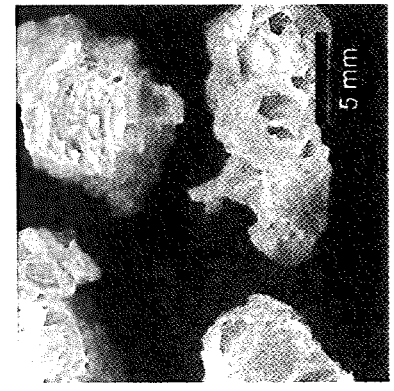
Figure 2:
Figure 2:
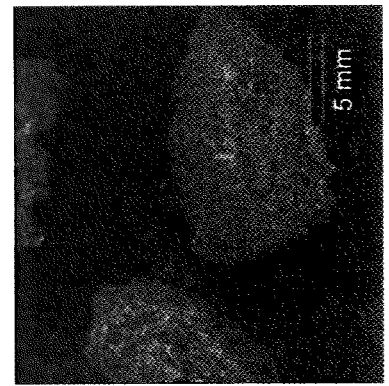
Figure 2:
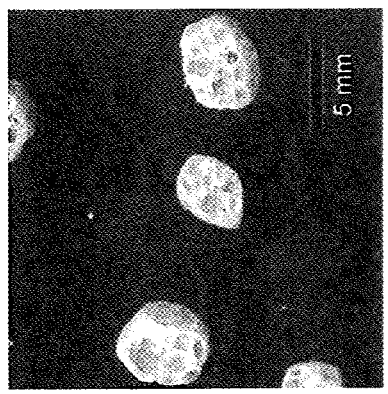
Figure 2:
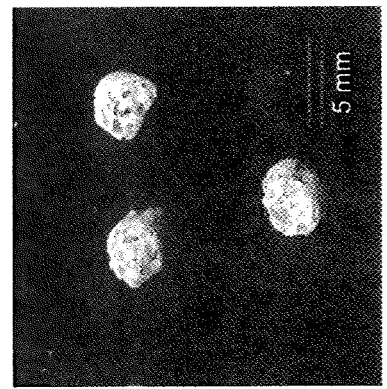

Macroscopic and microscopic images of Sample 16 (Table 1), Sample 5, which contains no added oil (Table 1), two commercially available TVP products, and two commercially available protein (soy) crisps were taken to examine the structure of each sample. The surface of extruded pieces were imaged using an Epson® V700 (Epson America Inc., California, USA) photographic scanner. Pieces were also sectioned using a razor blade and the interior of pieces were imaged using an Epson V700 photographic scanner. FIG. 1 shows macroscopic images of the surfaces of representative pieces of each sample, while FIG. 2 shows macroscopic images of the interiors of representative pieces of each sample, with 1A and 2A being Sample 16, 1B and 2B being Sample 5, 1C and 2C being a first TVP product, 1D and 2D being a second TVP product, 1E and 2E being a first protein crisp, and 1F and 2F being a second protein crisp.

Figure 3:
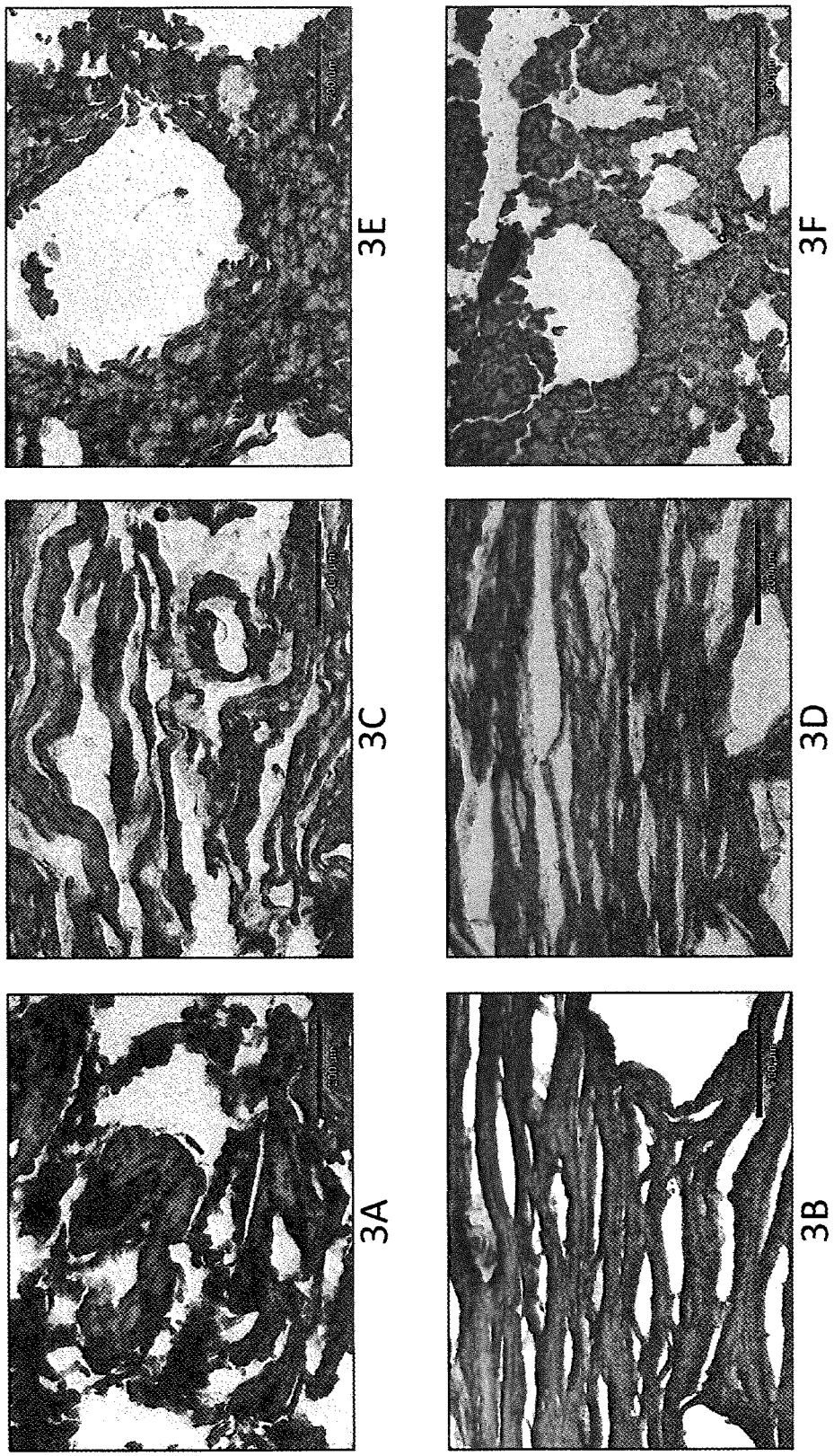
FIG. 3 includes light micrographs of an extruded piece according to one embodiment (FIG. 3A), a piece that does not include oil (FIG. 3B), two commercially available textured vegetable protein products (FIGS. 3C and 3D), and two commercially available puffed soy protein crisps (FIGS. 3E and 3F).

Extruded pieces were prepared for transmitted light microscopy by hydrating pieces from each sample in a refrigerated 50:50 mixture of Tissue-Tek® O.C.T™ (Sakura Finetek Europe B.V., The Netherlands) and water until the center was hydrated. Once rehydrated, pieces were frozen and then cut into 20 micron sections using a cryostatic microtome. The sections were stained using 0.1% Ponceau 2R, which stains protein red, and an aqueous iodine solution, which stains starch blue. The sections were imaged using an Olympus® AX70 Microscope light microscope with a 20× objective and Olympus® DP70 digital camera with a 10× eyepiece (Olympus America Inc., Pennsylvania, USA). FIG. 3 compares light micrographs of an example of an extruded piece (Sample 16 from Table 1; FIG. 3A), a piece containing no oil (Sample 5 from Table 1; FIG. 3B), two commercially available TVP products (FIGS. 3C and 3D), and two commercially available soy crisps (FIGS. 3E and 3F). Sample 16 (FIG. 3A) had relatively large protein granules or agglomerations of non-linearly oriented protein surrounded by protein matrix disruptive ingredient (starch in this example) in a loosely packed structure. This contrasts to Sample 5 (FIG. 3B), which had fibrous, linearly-oriented protein with protein matrix disruptive ingredient dispersed in spaces between protein strands rather than having protein granules within, or surrounded by, a matrix that includes protein matrix disruptive ingredient. Commercially available TVP products (FIGS. 3C and 3D) appeared similar in structure to Sample 5, with fibrous, linearly oriented protein and no protein granules. Without being bound to theory, it is believed that the similarity of the monolithic, fibrous, linearly oriented protein structure of the commercially available TVP products to Sample 5 is, in part, due to absence of any significant amount of oil during extrusion. Commercially available soy crisps (FIGS. 3E and 3F) showed agglomerations of protein that are smaller and more tightly packed compared to Sample 16 (FIG. 3A).

Figure 4:
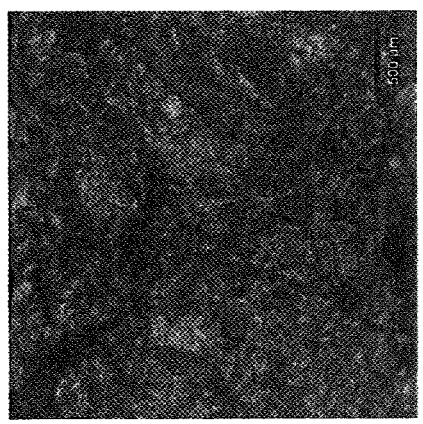
FIG. 4 includes confocal micrographs of an extruded piece according to one embodiment (FIG. 4A), a piece that does not include oil (FIG. 4B), two commercially available textured vegetable protein products (FIGS. 4C and 4D), and two commercially available puffed soy protein crisps (FIGS. 4E and 4F).
Figure 4:
Figure 4:
Figure 4:
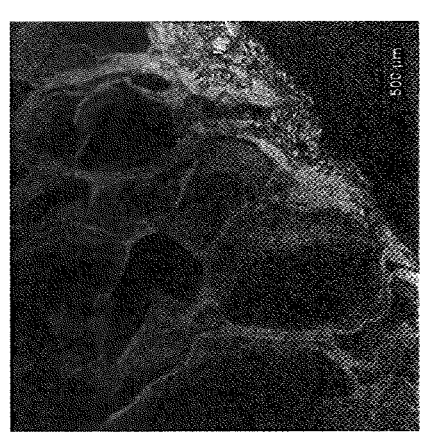
Figure 4:
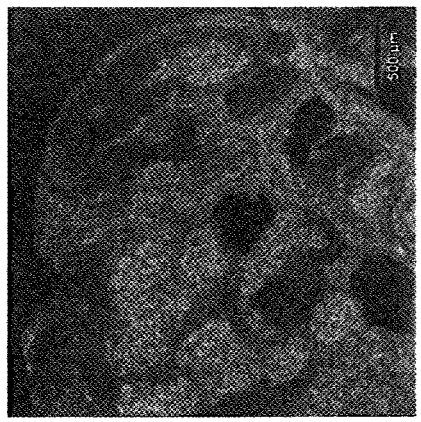
Figure 4:

Extruded pieces were prepared for confocal microscopy by cross-sectioning representative pieces from each sample with a razor blade. Autofluorescence of at the cut surface was imaged using an Olympus Fluoview 1000 confocal microscope with a 4× objective and 425-475 nm, 500-530 nm, and 560-660 nm emission filters after excitation at 405 nm, 488 nm, and 568 nm lasers, respectively. The images in FIG. 4 are z-stacks of 10 micron optical sections, with imaged stacks from each laser overlaid. It was observed that the TVP samples autofluoresced under the 568 nm laser, but the other samples did not. Thus, images for the TVP samples (4C and 4D) include overlays of images obtained using excitation at 405 nm, 488 nm, and 568 nm, while images for Sample 16 (4A), Sample 5 (4B), and commercially available protein crisps (4E and 4F) include overlays of images obtained using excitation at 405 nm and 488 nm.

Example 2

Extruded pieces including a protein matrix disruptive ingredient comprising insoluble fiber (e.g., oat hull fiber), were produced. Formulations including soy protein isolate (SPI), flour (F), insoluble fiber (IF), sugar (S), oil (O), water (W), and flavor (R) according to Table 3 (SPI, F, IF, S, and R are shown as % weight of dry ingredients and O and W are shown as % weight of protein matrix composition) were combined to form a protein matrix composition, formed, and dried similarly to Example 1.

TABLE 3

| Sample | SPI | F | IF | S | R | W | O | SME (Wh/kg) | Die temp. (° F.) | Die press. (PSI) |
|---|---|---|---|---|---|---|---|---|---|---|
| 1 | 55.4 | 20.0 | 20.0 | 4.0 | 0.6 | 43.0 | 4.7 | 29.8 | 274 | 300 |
| 2 | 55.4 | 20.0 | 20.0 | 4.0 | 0.6 | 40.9 | 8.9 | 23.0 | 270 | 242 |
| 3 | 55.4 | 20.0 | 20.0 | 4.0 | 0.6 | 48.9 | 7.8 | 16.1 | 261 | 194 |
| 4 | 45.4 | 20.0 | 30.0 | 4.0 | 0.6 | 48.6 | 7.8 | 17.3 | 256 | 201 |
| 5 | 45.4 | 20.0 | 30.0 | 4.0 | 0.6 | 36.4 | 9.7 | 31.4 | 271 | 291 |
| 6 | 45.4 | 20.0 | 30.0 | 4.0 | 0.6 | 36.4 | 9.7 | 29.9 | 273 | 287 |
| 7 | 35.4 | 20.0 | 40.0 | 4.0 | 0.6 | 34.2 | 10.0 | 34.8 | 280 | 313 |

Extruded pieces surprisingly incorporated the insoluble fiber without compromising the texture or flavor of the pieces. Extruded pieces including relatively high amounts of fiber could be used in various food products, such as granola, RTE cereal, or chewy or crunchy grain bars, to increase protein and/or fiber content while providing an enjoyable eating experience.

Example 3

Extruded pieces having almond inclusions were produced. Formulations including soy protein isolate (SPI), flour (F), inclusions (I), sugar (S), oil (O), water (W), and flavor (R) according to Table 4 (SPI, F, I, S, and R are shown as % weight of dry ingredients and O and W are shown as % weight of protein matrix composition) were combined to form a protein matrix composition, formed, and dried similarly to Example 1. It is noted that the amount of oil includes the amount contributed by both the almond inclusions and added oil.

TABLE 4

| Sample | SPI | F | S | R | I | W | O | SME (Wh/kg) | Die temp. (° F.) | Die press. (PSI) |
|---|---|---|---|---|---|---|---|---|---|---|
| 1 | 65.4 | 30.0 | 4.0 | 0.6 | 12.3 | 31.5 | 12.0 | 27.9 | 273 | 348 |
| 2 | 65.4 | 30.0 | 4.0 | 0.6 | 11.6 | 35.5 | 11.3 | 26.5 | 266 | 325 |
| 3 | 65.4 | 30.0 | 4.0 | 0.6 | 10.8 | 39.9 | 10.5 | 23.8 | 261 | 287 |

Extruded pieces had an acceptable texture and macroscopically identifiable almond pieces.

Figure 5:
FIG. 5 is a polarized light micrograph of an extruded piece having inclusions according to another embodiment.

Samples were prepared for polarized light microscopy using the same hydration procedure and equipment as for the light microscopy in Example 1, except the microscope was equipped with polarizing filters and first order red plate, and a 10× objective with a 10× eyepiece. As shown in FIG. 5, polarized light microscopy showed relatively large protein granules of substantially non-linearly oriented protein surrounded by protein matrix disruptive ingredient in a loosely packed structure similar to Sample 16 in Example 1. In addition, nut inclusions and bran are identifiable, as shown in FIG. 5.

Example 4

Additional extruded pieces were produced that included a powdered protein ingredient comprising a combination of soy protein isolate and whey protein using a protocol similar to Example 1. The extruded pieces had an acceptable texture, but were slightly crispier than the acceptable samples in Example 1. Extruded pieces comprising whey protein can be used to produce food products where a crispier texture is desired.

Additional samples were also produced using a protocol similar to Example 1 and included a protein matrix disruptive ingredient that comprised apple powder (10% by weight dry ingredients), cinnamon (1.5-2% by weight dry ingredients), or cocoa powder (1.5-2% by weight dry ingredients). The extruded pieces were determined to have an acceptable texture. The samples that included apple flakes had a light color and an apple flavor. The samples that included cocoa were brown in color. Oat flour and rice flour were also tested as protein matrix disruptive ingredients, and both produced acceptable extruded pieces.

Additional inclusions were also tested, including dried cranberry pieces, rolled oats, whole sweet corn, coconut, flax seed, and chia seed. All of the tested inclusions resulted in extruded pieces with macroscopically visible inclusions.

Example 5

Formulations including soy flour (SF), soy protein concentrate (SPC), soy protein isolate (SPI), grain flour (F), sugar (Su), salt (Sa), oil (O), water (W), and/or flavor (R) according to Table 5 (SF, SPC, SPI, F, Su, Sa, and R are shown as % weight of dry ingredients and O and W are shown as % weight of protein matrix composition) were combined in a Buhler BCTL-42 extruder to form a protein matrix composition. The protein matrix composition was extruded through a single hole die having a diameter of 0.159 inches (4 mm) and cut to form protein matrix composition pieces approximately 5 mm to 10 mm. The pieces were dried using tray dryer to a moisture content of about 1.5% to about 8% to form extruded pieces.

Extruded pieces were mixed into a pasta salad (Betty Crocker™ Suddenly Pasta Salad™ Ranch and Bacon, General Mills, Inc., Minneapolis, Minn., USA) and eaten to determine acceptability of texture for consumption as a bacon bit substitute (Table 6). Briefly, the pasta salad was prepared according to the directions on the package, but replacing the imitation bacon bits with extruded pieces from Table 5 and omitting optional ingredients, and refrigerated for 30 minutes before eating.

Protein and moisture content provided in Table 6 were measured as described in Example 1.

TABLE 6

| Sample | Measured protein (% wt) | Moisture (% wt) | Texture liking |
|---|---|---|---|
| B1 | 44.9 | 5.73 | |
| B2 | 39.5 | 7.16 | |
| B3 | 43.9 | 6.36 | |
| B4 | 59.7 | 2.18 | + |
| B5 | 62.0 | 4.51 | |
| D1 | 60.2 | 7.04 | |
| D2 | 61.8 | 6.09 | |
| D3 | 59.6 | 9.24 | |
| D4 | 61.0 | 3.51 | ++ |
| D5 | 62.0 | 5.36 | |
| D6 | 57.0 | 4.09 | + |
| D7 | 60.7 | 4.62 | |

Extruded pieces from samples D1-D7 from Table 5 were subjected to texture analysis according to Example 1. In addition, extruded pieces from all the samples listed in Table 5 were subjected to an alternate texture analysis method. Briefly, extruded pieces from each sample were passed through a ⅜ sieve, with the pieces retained on the ⅜ sieve discarded. The remaining pieces were passed through a #4 sieve. Pieces retained by the #4 sieve were subjected to texture analysis. Multiple extruded pieces from each sample were placed in a trough on the stage of a TA.HDPlus Texture Analyzer and subjected to a 50% strain test at a speed of 2 mm/second using a 250 kg load cell and a single rounded blade. The average 50% strain force of 5 replicates was measured in kg. In Table 7, the measured texture analysis values for both methods are provided for samples D1-D7. For samples B1-B5, the measured texture values for the alternate texture analysis method are provided and texture values that correlate to the texture analysis method in Example 1 were calculated and are provided in Table 7. It was determined that acceptable extruded pieces identified in Table 6 had texture analysis values that correlated to from about 1000 g to about 7400 g force, with texture analysis values around about 2000 g to about 5000 g force being more preferred.

TABLE 5

| Sample | SF | SPC | SPI | F | Su | Sa | O | W | R | SME (Wh/kg) | Die temp. (° F.) | Die press. (PSI) |
|---|---|---|---|---|---|---|---|---|---|---|---|---|
| B1 | 93 | 0 | 0 | 0 | 1 | 1.5 | 4.2 | 43.8 | 4.5 | 31 | 257 | 164 |
| B2 | 0 | 64.2 | 0 | 28.8 | 1 | 1.5 | 20.9 | 27.6 | 4.5 | 31 | 264 | 154 |
| B3 | 0 | 0 | 53 | 40 | 1 | 1.5 | 8.1 | 30.6 | 4.5 | 45 | 274 | 261 |
| B4 | 0 | 86 | 0 | 0 | 2 | 3 | 4.2 | 41.1 | 9 | 39 | 270 | 350 |
| B5 | 0 | 0 | 77.2 | 15.8 | 1 | 1.5 | 8.1 | 38.1 | 4.5 | 24 | 261 | 184 |
| D1 | 0 | 90.5 | 0 | 0 | 2 | 3 | 4.2 | 39.5 | 4.5 | 38 | 264 | 363 |
| D2 | 0 | 90.5 | 0 | 0 | 2 | 3 | 4.2 | 43.8 | 4.5 | 35 | 261 | 327 |
| D3 | 0 | 90.5 | 0 | 0 | 2 | 3 | 4.2 | 43.8 | 4.5 | 34 | 275 | 347 |
| D4 | 0 | 90.5 | 0 | 0 | 2 | 3 | 8.1 | 49 | 4.5 | 21 | 264 | 193 |
| D5 | 0 | 90.5 | 0 | 0 | 2 | 3 | 4.2 | 43.8 | 4.5 | 34 | 263 | 347 |
| D6 | 4 | 80 | 0 | 2 | 2 | 3 | 8.1 | 38.1 | 9 | 33 | 263 | 284 |
| D7 | 0 | 88.5 | 0 | 0 | 4 | 3 | 4.2 | 43.8 | 4.5 | 33 | 261 | 346 |

TABLE 7

| Sample | Ex. 1 Method Texture (measured, in grams) | Ex. 1 Method Texture (calculated, in grams) | Alt. Method Texture (measured, in kilograms) |
| --- | --- | --- | --- |
| B1 | | 4890 | 32.6 |
| B2 | | 9195 | 61.3 |
| B3 | | 8565 | 57.1 |
| B4 | | 3855 | 25.7 |
| B5 | | 3855 | 25.7 |
| D1 | 2349 | | 21.8 |
| D2 | 3972 | | 22.8 |
| D3 | 6208 | | 49.5 |
| D4 | 2014 | | 11.5 |
| D5 | 3596 | | 25.8 |
| D6 | 2280 | | 14.7 |
| D7 | 4947 | | 23.8 |

Particle density was measured as described in Example 1. The average particle density for acceptable extruded pieces (see, Table 6) ranged from about 0.7 g/cc to about 1.0 g/cc, with densities from about 0.7 g/cc to about 0.9 g/cc being more preferred.

Extruded pieces from Table 5 were also tested to determine cold water and hot water hydration rates. In order to determine cold water hydration rate, 20 g of each sample was combined with 200 g water at 67° F., and allowed to sit at room temperature for 10 minutes. The extruded pieces were then drained for 30 seconds using a strainer and the mass of the drained pieces was measured. The cold water hydration rate was calculated by dividing the mass of the drained extruded pieces divided by the mass of the extruded pieces prior to combination with water (20 g). In order to determine hot water hydration rate, 20 g of each sample was combined with 200 g boiling water, covered, and allowed to sit at room temperature for 5 minutes. The extruded pieces were then drained for 30 seconds using a strainer, and the mass of the drained pieces was measured. The hot water hydration rate was calculated in the same way the cold water hydration rate was calculated. Cold water hydration rates for extruded pieces identified in Table 6 as being acceptable as a bacon bit substitute ranged from about 2.1 to about 2.7. Hot water hydration rates for extruded pieces identified in Table 6 as being acceptable as a bacon bit substitute ranged from about 3.0 to about 3.75.

Figure 6:
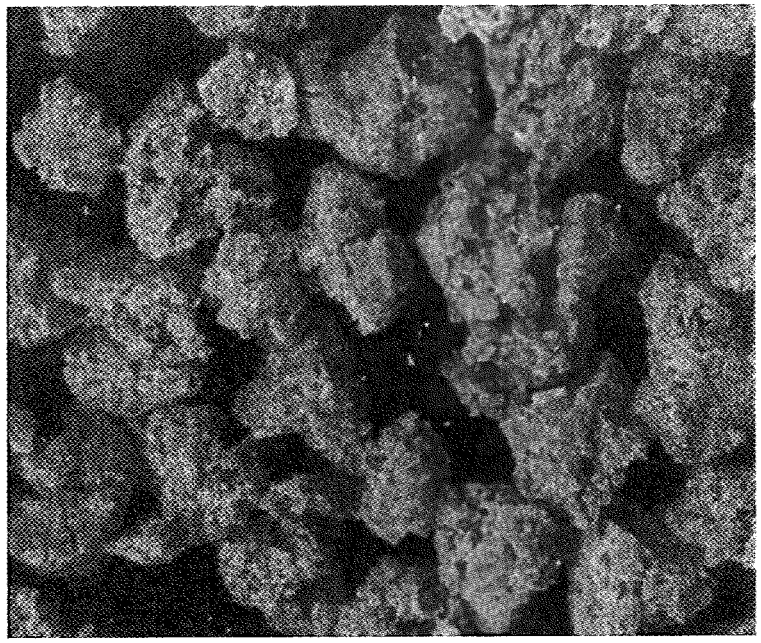
FIG. 6 includes macroscopic images of the surfaces of a textured vegetable protein-based imitation bacon bit (TVP imitation bacon bits, left image) and an extruded piece according to an embodiment disclosed herein (right image) that is suitable for use as a bacon bit replacement.
Figure 6:
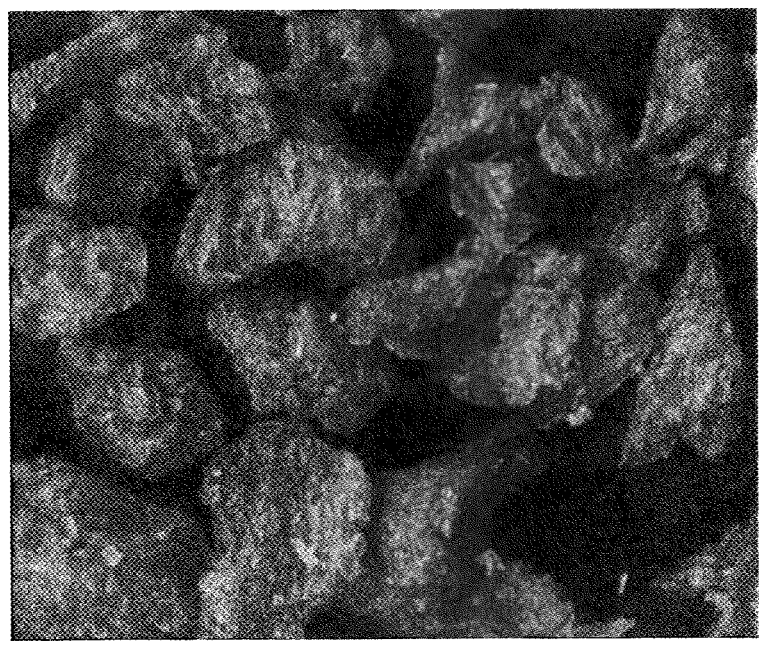

Macroscopic and microscopic images of Samples B4 (Table 5) were taken to examine the structure of each sample and compared to a commercially available textured vegetable protein-based bacon bit (TVP imitation bacon bits). Macroscopic surface images (FIG. 6), and 0.1% Ponceau 2R/aqueous iodine stained sample light micrographs (FIG. 7) were obtained according to the methods described in Example 1. As visible in FIG. 6, the surface of Sample B4 extruded pieces appear rougher and less flat than the TVP imitation bacon bits. FIG. 7 shows that the TVP imitation bacon bits have an aligned, fibrous, linearly-oriented protein structure throughout, while Sample B4 has protein granules with varying degrees of linear orientation surrounded by a matrix including a matrix disruptive ingredient (non-protein components of SPC). The protein matrix within the protein granules is not as long or neatly aligned and linear as the structure throughout the TVP imitation bacon bits. The protein matrix within the protein granules also does not appear fibrous, as does the protein matrix of the TVP imitation bacon bits.

Example 6

Formulations including soy protein isolate (SPI), grain flour (F), oil (O), water (W), and/or flavor (R) according to Table 8 (SPI, F, and R are shown as % weight of dry ingredients and O and W are shown as % weight of protein matrix composition) were combined in a Buhler BCTL-42 extruder to form a protein matrix composition. The protein matrix composition was extruded through a single hole die having a diameter of 0.159 inches (4 mm) and cut to form protein matrix composition pieces approximately 5 mm to 10 mm. The pieces were dried using tray dryer to a moisture content of about 1.5% to about 8% to form extruded pieces.

TABLE 8

| Sample | SPI | F | O | W | R | SME (Wh/kg) | Die temp. (° F.) | Die press. (PSI) |
| --- | --- | --- | --- | --- | --- | --- | --- | --- |
| V16 | 81.6 | 14.4 | 13 | 48.6 | 4 | 16.6 | 259 | 103 |
| V17 | 86.4 | 9.6 | 13 | 48.6 | 4 | 15.6 | 258 | 96 |

Hamburger Helper Cheeseburger Macaroni (General Mills, Inc.) as well as Hamburger Helper Stroganoff (General Mills, Inc.) were prepared according to the directions on the box, except instead of ground beef, samples from Table 8 were used and additional water was added to account for proper hydration of the extruded pieces. Additional water was added in amounts of about half to ¾ of the weight of the added protein pieces. It was observed that the protein pieces hydrated completely during the normal preparation procedure and time. Each of the samples from Table 8 exhibited a texture similar to ground beef upon preparation.

Extruded pieces from Table 8 were also tested to determine cold water and hot water hydration rates as described in Example 5. Cold water hydration rates for extruded pieces from Table 8 ranged from about 1.7 to about 1.9. Hot water hydration rates for extruded pieces from Table 8 ranged from about 2.5 to about 2.8.

Figure 8:
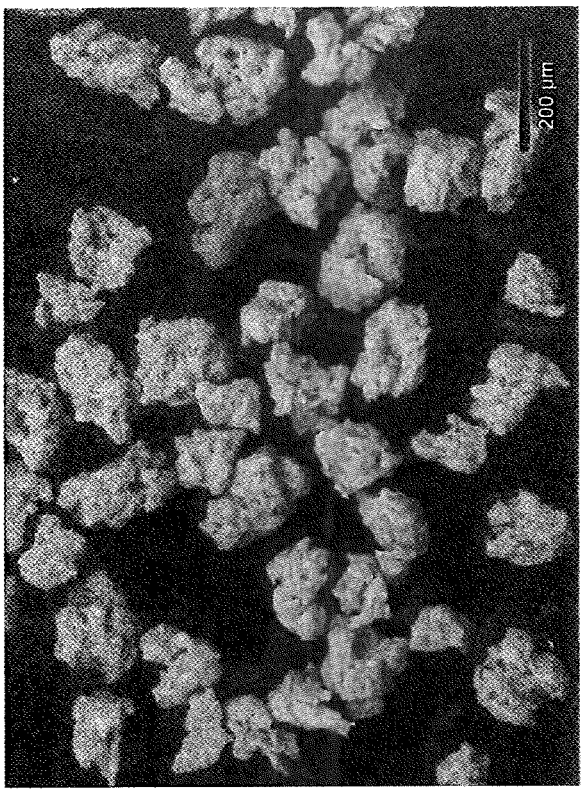
FIG. 8 includes macroscopic images of the surfaces of a textured vegetable protein-based imitation bacon bit (TVP imitation bacon bits, left image) and an extruded piece according to an embodiment disclosed herein (right image) that is suitable for use as ground beef replacement following hydration.
Figure 8:
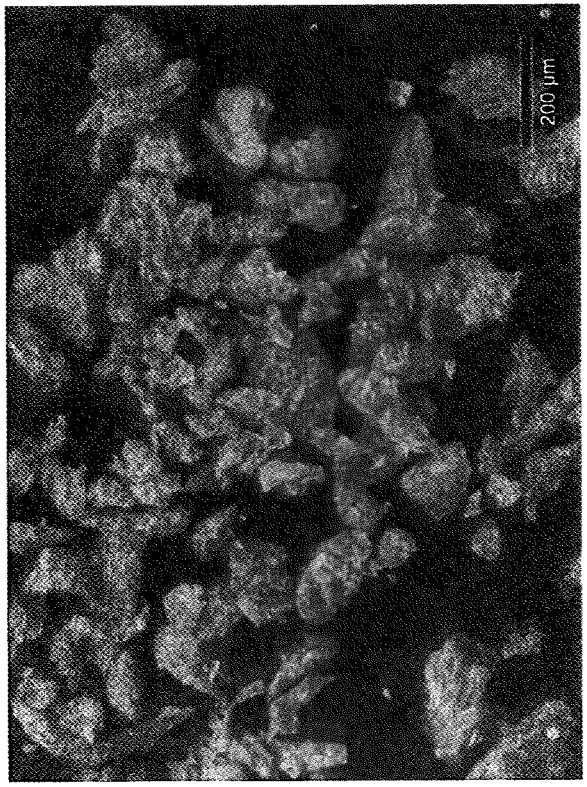

Macroscopic and microscopic images of Sample V16 were taken to examine the structure of each sample and compared to a commercially available textured vegetable protein-based bacon bit (TVP imitation bacon bits). Macroscopic surface images (FIG. 8), and 0.1% Ponceau 2R/aqueous iodine stained sample light micrographs (FIG. 9) were obtained according to the methods described in Example 1. As visible in FIG. 8, the surface of Sample V16 extruded pieces appear rougher and less flat than the TVP imitation bacon bits. FIG. 9 shows that the TVP imitation bacon bits have an aligned, fibrous, linear protein structure throughout, while Sample V16 has protein granules with varying degrees of linear orientation surrounded by a matrix including a matrix disruptive ingredient (grain flour). Starch from the grain flour in sample V16 is stained purple and is visible within the matrix surrounding the protein granules. The protein matrix within the protein granules does not appear to be fibrous or as long and neatly aligned and parallel as the structure throughout the TVP imitation bacon bits.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a frozen or refrigerated food product, comprising combining a first food component with at least a second food component to produce the frozen or refrigerated food product, wherein the first food component comprises extruded pieces having:

a. a protein content of from about 10% to about 65% by weight, wherein the protein content forms protein granules surrounded by a matrix comprising a protein matrix disruptive ingredient, the protein granules having:
 i. an average size greater than 75 μm, and
 ii. a protein matrix that is non-fibrous;
b. a moisture content of from about 25% to about 55% by weight, and
c. an oil content of from about 1% to about 15% by weight, the oil being substantially uniformly distributed throughout the extruded pieces;
wherein the extruded pieces are made by a method, the method comprising:
 1) processing, under extrusion conditions, a composition having a protein content of from about 10% to about 65% by weight, a moisture content of from about 25% to about 55% by weight and an oil content of from about 1% to about 15% by weight, the extrusion conditions comprising specific mechanical energy (SME) of from about 10 WH/kg to about 50 Wh/kg, a die temperature of about 200° F. to about 350° F., and a die pressure of from about 150 pounds per square inch (PSI) to about 1000 PSI, and
 2) forming the extruded pieces from the composition using an extruder die that exposes the composition to turbulence prior to exiting the extruder die.

2. The method of claim 1, wherein the frozen or refrigerated food product is a frozen or refrigerated pizza, or a frozen or refrigerated pasta product.

3. The method of claim 1, wherein the extruded pieces are formulated to perform as a substitute for bacon bits or as a substitute for ground meat.

4. A frozen or refrigerated food product comprising a first food component and at least a second food component, wherein the first food component comprises extruded pieces having:
a. a protein content of from about 10% to about 65% by weight, wherein the protein content forms protein granules surrounded by a matrix comprising a protein matrix disruptive ingredient, the protein granules having:
 i. an average size greater than 75 μm, and
 ii. a protein matrix that is non-fibrous;
b. a moisture content of from about 25% to about 55% by weight, and
c. an oil content of from about 1% to about 15% by weight, the oil being substantially uniformly distributed throughout the extruded pieces;
wherein the extruded pieces are made by a method, the method comprising:
 1) processing, under extrusion conditions, a composition having a protein content of from about 10% to about 65% by weight, a moisture content of from about 25% to about 55% by weight and an oil content of from about 1% to about 15% by weight, the extrusion conditions comprising specific mechanical energy (SME) of from about 10 WH/kg to about 50 Wh/kg, a die temperature of about 200° F. to about 350° F., and a die pressure of from about 150 pounds per square inch (PSI) to about 1000 PSI, and
 2) forming the extruded pieces from the composition using an extruder die that exposes the composition to turbulence prior to exiting the extruder die.

5. The frozen or refrigerated food product of claim 4, wherein the frozen or refrigerated food product is a frozen or refrigerated pizza, or a frozen or refrigerated pasta product.

6. The frozen or refrigerated food product of claim 4, wherein extruded pieces are formulated to perform as a substitute for bacon bits or as a substitute for ground meat.

7. The frozen or refrigerated food product of claim 4, wherein the protein comprises soy protein.

8. The frozen or refrigerated food product of claim 4, wherein the protein comprises whey protein, bean protein, pea protein, wheat protein, canola protein, or algae protein.

9. The frozen or refrigerated food product of claim 4, wherein the protein matrix disruptive ingredient comprises a non-protein component of a protein concentrate or a protein isolate.

10. The frozen or refrigerated food product of claim 4, wherein the protein matrix disruptive ingredient comprises a starch, a sugar, or a fiber.

11. A frozen or refrigerated food component comprising extruded pieces having:
a. a protein content of from about 10% to about 65% by weight, wherein the protein content forms protein granules surrounded by a matrix comprising a protein matrix disruptive ingredient, the protein granules having:
 i. an average size greater than 75 μm, and
 ii. a protein matrix that is non-fibrous;
b. a moisture content of from about 25% to about 55% by weight, and
c. an oil content of from about 1% to about 15% by weight, the oil being substantially uniformly distributed throughout the extruded pieces;
wherein the extruded pieces are made by a method, the method comprising:
 1) processing, under extrusion conditions, a composition having a protein content of from about 10% to about 65% by weight, a moisture content of from about 25% to about 55% by weight and an oil content of from about 1% to about 15% by weight, the extrusion conditions comprising specific mechanical energy (SME) of from about 10 WH/kg to about 50 Wh/kg, a die temperature of about 200° F. to about 350° F., and a die pressure of from about 150 pounds per square inch (PSI) to about 1000 PSI, and
 2) forming the extruded pieces from the composition using an extruder die that exposes the composition to turbulence prior to exiting the extruder die.

12. The frozen or refrigerated food component of claim 11, wherein extruded pieces are formulated to perform as a substitute for bacon bits or as a substitute for ground meat.

13. The frozen or refrigerated food component of claim 11, wherein the protein comprises soy protein.

14. The frozen or refrigerated food component of claim 11, wherein the protein comprises whey protein, bean protein, pea protein, wheat protein, canola protein, or algae protein.

15. The frozen or refrigerated food component of claim 11, wherein the protein matrix disruptive ingredient comprises a non-protein component of a protein concentrate or a protein isolate.

16. The frozen or refrigerated food component of claim 11, wherein the protein matrix disruptive ingredient comprises a starch, a sugar, or a fiber.

\* \* \* \* \*

UNITED STATES PATENT AND TRADEMARK OFFICE
CERTIFICATE OF CORRECTION

PATENT NO. : 10,918,117 B2
APPLICATION NO. : 15/000499
DATED : February 16, 2021
INVENTOR(S) : Goeran Walther et al.

It is certified that error appears in the above-identified patent and that said Letters Patent is hereby corrected as shown below:

On the Title Page

The correct inventorship is:
Goeran Walther, Plymouth, MN (US)
Steven C. Robie, Plymouth, MN (US)
Kevin H. Wright, Crystal, MN (US)
Joel R. Lafavor, Minnetonka, MN (US)
Caleb Ian Heck, Champlin, MN (US)

Signed and Sealed this
Fourth Day of April, 2023

Katherine Kelly Vidal
*Director of the United States Patent and Trademark Office*